United States Patent
Yoon et al.

(10) Patent No.: US 10,710,877 B2
(45) Date of Patent: Jul. 14, 2020

(54) METHOD AND APPARATUS FOR GENERATING HYDROGEN FROM FORMIC ACID

(71) Applicant: KOREA INSTITUTE OF SCIENCE AND TECHNOLOGY, Seoul (KR)

(72) Inventors: Chang Won Yoon, Seoul (KR); Suk Woo Nam, Seoul (KR); Yeong Cheon Kim, Seoul (KR); Jonghee Han, Seoul (KR); Sung Pil Yoon, Seoul (KR); Hyoung-Juhn Kim, Seoul (KR); Taekhyun Oh, Seoul (KR); Tae Hoon Lim, Seoul (KR); Jin Young Kim, Seoul (KR); Sun-Hee Choi, Seoul (KR); Hyung Chul Ham, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 85 days.

(21) Appl. No.: 15/326,118

(22) PCT Filed: Jan. 27, 2015

(86) PCT No.: PCT/KR2015/000841
§ 371 (c)(1),
(2) Date: Feb. 22, 2017

(87) PCT Pub. No.: WO2016/010222
PCT Pub. Date: Jan. 21, 2016

(65) Prior Publication Data
US 2017/0197828 A1 Jul. 13, 2017

(30) Foreign Application Priority Data
Jul. 18, 2014 (KR) .......... 10-2014-0091136

(51) Int. Cl.
*C01B 3/22* (2006.01)
*B01J 8/00* (2006.01)
(Continued)

(52) U.S. Cl.
CPC .......... *C01B 3/22* (2013.01); *B01D 5/00* (2013.01); *B01D 5/0057* (2013.01);
(Continued)

(58) Field of Classification Search
CPC ...................................... C01B 3/22
See application file for complete search history.

(56) References Cited

U.S. PATENT DOCUMENTS 6,362,305 B1 * 3/2002 Schweers .......... C01B 3/22
526/64
2007/0202369 A1 * 8/2007 Lee .......... H01M 8/04194
429/414
(Continued)

FOREIGN PATENT DOCUMENTS

JP 2009078200 A 4/2009
JP 2010208927 A 9/2010
(Continued)

OTHER PUBLICATIONS

Ting et al., Low activation energy dehydrogenation of aqueous formic acid on platinum-ruthenium-bismuth oxide at near ambient temperature and pressure, Chem. Commun., Oct. 22, 2009, pp. 7333-7335, The Royal Society of Chemistry.
(Continued)

*Primary Examiner* — Douglas B Call
(74) *Attorney, Agent, or Firm* — Goldilocks Zone IP Law

(57) ABSTRACT

The present invention provides a hydrogen generating apparatus and a hydrogen generating method, wherein the hydrogen generating apparatus generates hydrogen by dehydrating formic acid, and comprises: a reactor for containing
(Continued)

water and a heterogeneous catalyst; a formic acid feeder for feeding formic acid into the reactor; and a moisture remover for removing moisture generated from the reactor.

15 Claims, 4 Drawing Sheets

(51) Int. Cl.
| | |
|---|---|
| B01D 53/26 | (2006.01) |
| B01J 23/44 | (2006.01) |
| B01J 27/24 | (2006.01) |
| B01J 35/00 | (2006.01) |
| B01J 37/08 | (2006.01) |
| B01J 37/18 | (2006.01) |
| B01D 5/00 | (2006.01) |
| B01J 27/26 | (2006.01) |
| B01J 8/20 | (2006.01) |

(52) U.S. Cl.
CPC .............. *B01D 53/265* (2013.01); *B01J 8/00* (2013.01); *B01J 8/20* (2013.01); *B01J 23/44* (2013.01); *B01J 27/24* (2013.01); *B01J 27/26* (2013.01); *B01J 35/0006* (2013.01); *B01J 37/082* (2013.01); *B01J 37/18* (2013.01); *B01J 2208/0053* (2013.01); *B01J 2208/00168* (2013.01); *B01J 2208/00548* (2013.01); *B01J 2208/00893* (2013.01); *B01J 2219/00011* (2013.01); *C01B 2203/0277* (2013.01); *C01B 2203/0495* (2013.01); *C01B 2203/1064* (2013.01); *C01B 2203/1211* (2013.01)

(56) References Cited

U.S. PATENT DOCUMENTS

| | | | |
|---|---|---|---|
| 2010/0068131 A1* | 3/2010 | Laurenczy | ........... B01J 31/0215 423/648.1 |
| 2010/0311142 A1 | 12/2010 | Lee et al. | |
| 2011/0059378 A1 | 3/2011 | Chan et al. | |
| 2011/0158899 A1 | 6/2011 | Nakahara et al. | |
| 2014/0255296 A1* | 9/2014 | Beller | ........................ C01B 3/22 423/648.1 |
| 2015/0086473 A1* | 3/2015 | Yamaguchi | ........... C07C 45/002 423/658.2 |

FOREIGN PATENT DOCUMENTS

| | | | |
|---|---|---|---|
| KR | 10-2009-00732230 A | | 7/2009 |
| KR | 20110042329 A | | 4/2011 |
| KR | 10-2014-0022082 A | | 2/2014 |
| WO | WO 2008/047312 A1 | | 4/2008 |
| WO | WO2012/143372 | * | 10/2012 |
| WO | WO2013125712 | * | 8/2013 |

OTHER PUBLICATIONS

Lee et al., Carbon dioxide mediated, reversbible chemical hydrogen storage using a Pd nanocatalyst supported on mesoporous graphitic carbon nitride, Journal of Material Chemistry A, 2014, pp. 9490-9450, s1-s15, vol. 2, The Royal Society of Chemistry.
Boddien, Efficient Dehydrogenation of Formic Acid Using an Iron Catalyst, Science, Sep. 23, 2011, pp. 1733-1736, supporting documents, vol. 333.
Majewski, A Continuous-Flow Method for the Generation of Hydrogen from Formic Acid, ChemSusChem, Mar. 18, 2010, pp. 431-434, vol. 3, Wiley-VCH Verlag GmbH& Co. KGaA, Weinheim.
Jiang, B-Doped Pd Catalyst: Boosting Room-Temperature Hydrogen Production from Formic Acid-Formate Solutions, Journal of the American chemical society, Mar. 17, 2014, 4861-4864, vol. 136, American Chemical Society.

* cited by examiner

METHOD AND APPARATUS FOR GENERATING HYDROGEN FROM FORMIC ACID

CROSS REFERENCE TO RELATED PATENT APPLICATIONS

This application claims the benefit under 35 U.S.C. Section 371, of PCT International Application No. PCT/KR2015/000841, filed Jan. 27, 2015, which claimed priority to Korean Patent Application No. KR10-2014-0091136, filed Jul. 18, 2014, the disclosures of which are hereby incorporated by the references.

TECHNICAL FIELD

This disclosure relates to a method and apparatus for generating hydrogen from a formic acid, and more particularly, to a method and apparatus for generating hydrogen from a formic acid in a continuous-flow method using a heterogeneous catalyst and water.

BACKGROUND ART

A formic acid does not generate CO at a low reaction temperature (20 to 100° C.) under specific reaction conditions, easily discharges gas products (hydrogen and carbon dioxide) out of the system, has a relatively low hydrogen production cost (about 700 won/1 g $H_2$), and is produced by means of regeneration of products (circulation of $CO_2$). Due to such advantages, in these days, the formic acid attracts great interests as a hydrogen source of a polymer electrolyte membrane fuel cell (PEMFC).

For the decomposition reaction of a formic acid, there are two paths as follows. Carbon monoxide produced by a dehydration reaction poisons a platinum catalyst of the PEMFC which is a mobile fuel cell. Thus, a study for developing a catalyst capable of suppressing the dehydration reaction and having great activity to a dehydrogenation reaction is being actively performed.

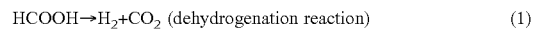

$$HCOOH \rightarrow H_2 + CO_2 \text{ (dehydrogenation reaction)} \quad (1)$$

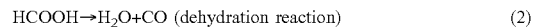

$$HCOOH \rightarrow H_2O + CO \text{ (dehydration reaction)} \quad (2)$$

However, the formic acid decomposition reaction is known as decreasing its activity as the concentration of the formic acid increases. This is because CO is accumulated at the catalyst when a high-concentration formic acid is used. If a formic acid of about 9.9 M (45 wt %) is used, the activity is rapidly lowered to reduce the gas generation rate, and it is known that only 19% of the formic acid is decomposed for about 2 hours 30 minutes.

Table 1 below comparatively shows a weight of fuel to have energy of 1000 Wh. In order to compare weights of fuels, the performance of a commercial fuel cell system, manufactured by Horizon Fuel Cell Technologies, using 25 wt % of $NaBH_4$ as a solution was referred to. If 12 wt % of formic acid is used, 13.19 kg of fuel is required to have energy of 1000 Wh. This is about 10 times of the weight of 25 wt % of $NaBH_4$ solution. In a mobile fuel cell system, an energy density is most important. This is because a fuel cell system of the same weight can be used for a longer time without recharging as the energy density is greater.

TABLE 1

| Fuel | Weight (kg) |
|---|---|
| 25 wt % $NaBH_4$ solution | 1.30 |
| 12 wt % formic acid solution | 13.19 |

In the existing technique, a liquid homogeneous catalyst and amine serving as a reaction accelerator are used to attempt a hydrogen generation system, but the hydrogen generation rate becomes unstable as the operations repeat, due to evaporation of amine and the deteriorated activity of catalyst.

DISCLOSURE

Technical Problem

In order to solve the above problems, the present disclosure is directed to providing a method and apparatus for generating hydrogen, in which water easily available in the vicinity is used, different from an existing technique where amine is used as a reaction accelerator, in which water generated through reactions at a fuel cell is condensed and used again to maintain a constant amount of water, different from an existing technique where a system is unstable due to the evaporation of amine, and also in which a heterogeneous catalyst is used so that the catalyst may be easily separated and reused.

Technical Solution

In one general aspect, there is provided an apparatus for generating hydrogen by dehydrogenation of a formic acid, comprising:
a reactor containing water and a heterogeneous catalyst;
a formic acid feeder configured to supply a formic acid into the reactor; and
a moisture remover configured to remove moisture generated at the reactor.

In an embodiment of the present disclosure, the apparatus for generating hydrogen may further comprise a freezer configured to condense the moisture removed by the moisture remover and supply the condensed moisture to the reactor.

In an embodiment of the present disclosure, the heterogeneous catalyst is a solid catalyst.

In an embodiment of the present disclosure, the formic acid supplied to the reactor by the formic acid feeder may be an aqueous formic acid solution with a concentration of 70 to 99.9 wt %.

In an embodiment of the present disclosure, the formic acid feeder may supply the formic acid to the reactor at a feed rate of 0.1 mL to 2.2 L per minute.

In an embodiment of the present disclosure, the water and the formic acid supplied to the reactor by the formic acid feeder may be mixed at the reactor to form an aqueous formic acid solution with a concentration of 20 to 90 wt %.

In another aspect, the present disclosure may provide a method for generating hydrogen by dehydrogenation of a formic acid, comprising, adding a formic acid to a mixture of water and a heterogeneous catalyst to perform a dehydrogenation reaction.

In an embodiment of the present disclosure, the method may further comprise removing a moisture generated at the dehydrogenation reaction.

In an embodiment of the present disclosure, the method may further comprise condensing the moisture removed in the moisture removing step and using the condensed moisture as water for the dehydrogenation reaction.

Advantageous Effects

In the method and apparatus for generating hydrogen according to the present disclosure, since the extent of a formic acid decomposition of 90% or above is exhibited at an early stage by using a high-concentration formic acid, an excellent energy density may be obtained, and thus the present disclosure may be applied as an excellent hydrogen source for a mobile fuel cell system.

BEST MODE

Hereinafter, embodiments of the present disclosure will be described in detail so that the present disclosure can be easily implemented by those having ordinary skill in the art.

The present disclosure provides an apparatus for generating hydrogen by dehydrogenation of a formic acid, comprising:
 a reactor containing water and a heterogeneous catalyst;
 a formic acid feeder configured to supply a formic acid into the reactor; and
 a moisture remover configured to remove moisture generated at the reactor.

The apparatus for generating hydrogen according to the present disclosure may further comprise a freezer configured to condense the moisture removed by the moisture remover and supply the condensed moisture to the reactor. In the present disclosure, the freezer may be a cold trap bath, without being limited thereto.

Figure 2:
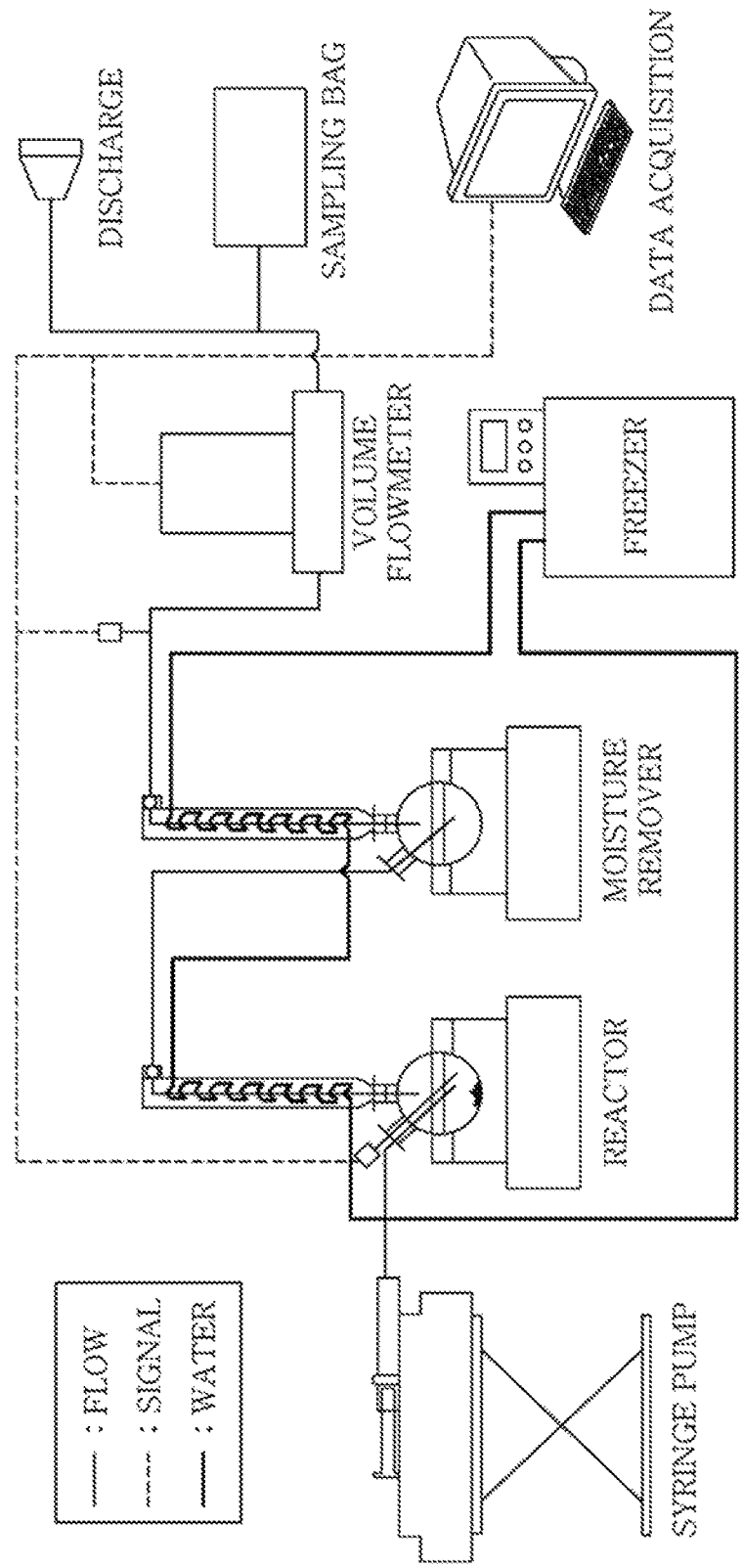
FIG. 2 is a block diagram showing an apparatus for generating hydrogen according to an embodiment of the present disclosure.

FIG. 2 is a block diagram showing the apparatus for generating hydrogen according to the present disclosure. A syringe pump supplies a formic acid to the reactor at a constant feed rate. The formic acid reacts with a catalyst in the reactor to generate hydrogen and carbon dioxide. The supplied formic acid is mixed with water in the reactor, and the concentration of the formic acid in the reactor is maintained to be 10 wt % or below. The freezer condenses evaporating moisture. A generation rate of the generated gas is measured using a volume flowmeter.

In the present disclosure, the heterogeneous catalyst represents a catalyst whose phase is different from the formic acid during a dehydrogenation reaction. In other words, the formic acid used in the present disclosure may be liquid, and the heterogeneous catalyst may be a solid catalyst.

In the present disclosure, the heterogeneous catalyst may employ catalysts prepared using various metals or supports.

In the present disclosure, the metal of the heterogeneous catalyst may be at least one selected from the group consisting of Pt, Rh, Ru, Au, Ag, Pd, Ni, Co, Cu, and Fe, and the support may be at least one selected from the group consisting of metal foam, carbon supports (carbon sheet, carbon felt, carbon black, carbon nanotube), and porous supports ($Al_2O_3$, $ZrO_2$, $TiO_2$, $CeO_2$). A Pd/mpg-$C_3N_4$ (Pd/meso porous g-$C_3N_4$) catalyst may be used, without being limited thereto.

In the existing technique, when a hydrogen-generating reaction is performed, a homogeneous catalyst is used and thus is not easily separated. However, the heterogeneous catalyst used in the present disclosure at a hydrogen-generating reaction may be easily separated and reused.

In the present disclosure, the formic acid supplied to the reactor by the formic acid feeder may be an aqueous formic acid solution with a concentration of 70 to 99.9 wt %. If the concentration is less than 70 wt %, the energy density is lowered. If the concentration is greater than 99.9 wt %, costs may be increased due to the use of a high-purity formic acid.

In the present disclosure, the formic acid supplied to the reactor by the formic acid feeder is mixed with water at the reactor. At this time, the water and the formic acid supplied to the reactor by the formic acid feeder may be mixed at a weight ratio of water:formic acid=10 to 30:20 to 50.

In the present disclosure, when the formic acid feeder supplies the formic acid to the reactor, the formic acid may be supplied at a feed rate of 0.1 mL to 2.2 L per minute (a formic acid feed rate for supplying hydrogen to a 100 kW PEMFC). In other words, the formic acid may be applied as a hydrogen source of a commercial PEMFC (0 to 100 kW).

When the water and the formic acid supplied by the formic acid feeder are mixed at the reactor of the present disclosure, an aqueous formic acid solution with a concentration of 20 to 90 wt %, preferably 20 to 40 wt %, may be formed. If the concentration is less than 20 wt %, the energy density is lowered. If the concentration is greater than 90 wt %, the performance may deteriorate due to the accumulation of formic acid.

The formic acid solution formed by mixing the water and the formic acid supplied by the formic acid feeder at the reactor performs a dehydrogenation reaction at a temperature of 40 to 100° C., preferably 40 to 90° C., and hydrogen is generated through the dehydrogenation reaction. Since the formic acid is supplied at a constant feed rate and decomposed at the reactor, during the dehydrogenation reaction, the concentration of the formic acid in the reactor is maintained to be 10 wt % or below.

In addition, the present disclosure provides a method for generating hydrogen by dehydrogenation of a formic acid, comprising, adding a formic acid to a mixture of water and a heterogeneous catalyst to perform a dehydrogenation reaction; removing a moisture generated at the dehydrogenation reaction; and condensing the moisture removed in the moisture removing step and using the condensed moisture as water for the dehydrogenation reaction.

The method for generating hydrogen according to the present disclosure is a continuous-flow method, and the water generated at the formic acid dehydrogenation reaction may be injected into the reactor and used again for the dehydrogenation reaction.

The method and apparatus for generating hydrogen according to the present disclosure gives the following advantages.

(1) Use of water: Water easily available in the vicinity is used, different from an existing technique where amine is used as a reaction accelerator. Water generated through reactions at a fuel cell is condensed and used again to maintain a constant amount of water, different from an existing technique where a system is unstable due to the evaporation of amine.

(2) Use of a heterogeneous catalyst: A heterogeneous catalyst is used so that the catalyst may be easily separated and reused.

As described above, in an existing formic acid decomposition reaction, the activity is lowered as the concentration of the formic acid increases. However, in the method and apparatus for generating hydrogen according to the present disclosure, since the extent of a formic acid decomposition of 90% or above is exhibited at an early stage even though a high-concentration formic acid is used, an excellent energy density may be obtained. Therefore, the method and apparatus for generating hydrogen according to the present disclosure may be applied as an excellent hydrogen source for a mobile fuel cell system.

Hereinafter, the present disclosure will be described in more detail through examples. However, these examples are just for illustration of the present disclosure and not intended to limit the scope of the present disclosure.

EXAMPLE 1

Figure 1:
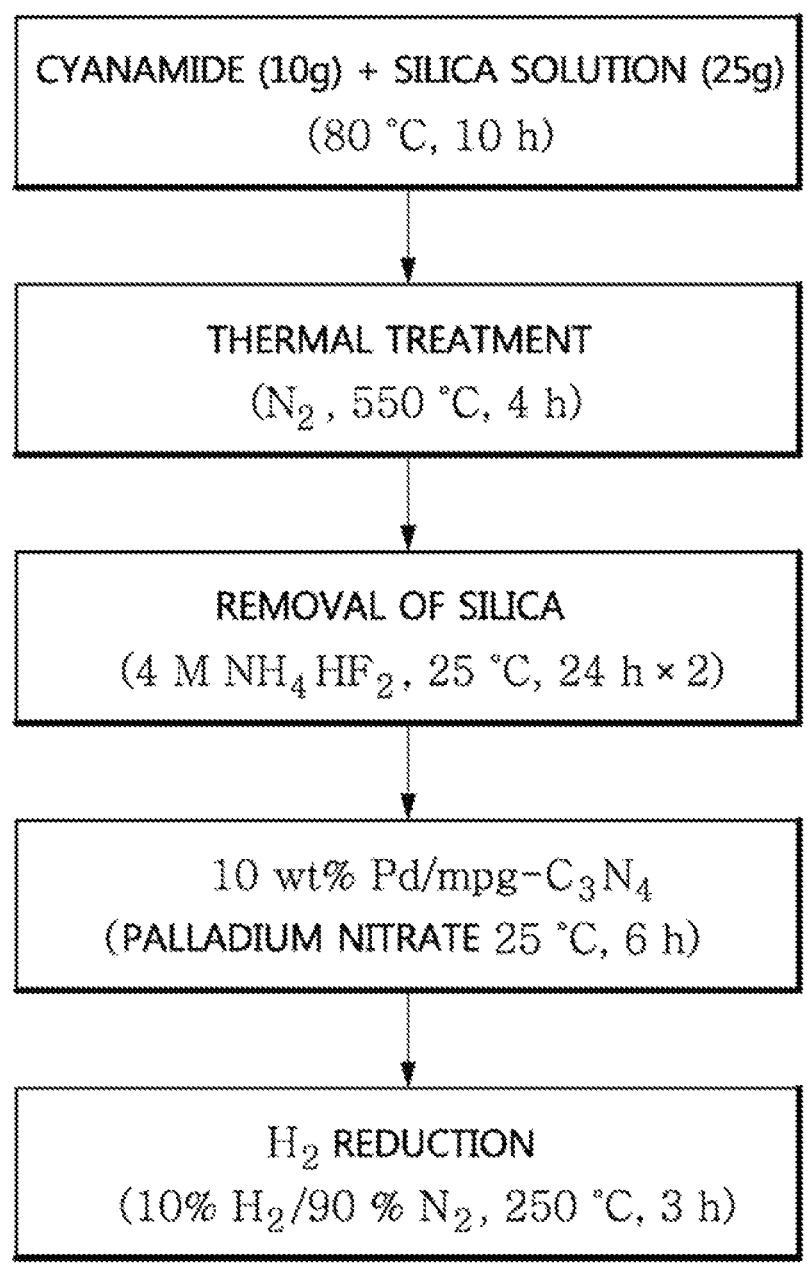
FIG. 1 a flowchart for illustrating a process of preparing a catalyst, used for an apparatus for generating hydrogen according to an embodiment of the present disclosure.

A Pd/mpg-$C_3N_4$ catalyst was prepared according to the process depicted in FIG. 1. In other words, a hard template was prepared using cyanamide and silica solution, and a support was prepared by means of thermal treatment and removal of silica. After that, a catalyst was prepared using palladium nitrate, and reduction was performed using a 10% hydrogen gas.

6 g of the prepared Pd/mpg-C3N4 catalyst and 40 g of water were put into a reactor, and the internal temperature of the reactor was adjusted to 55° C. A formic acid with a concentration of 98% (57 g in total) was supplied at a feed rate of 0.22 mL per minute to generate a hydrogen gas ($CO_2+H_2$:0.28 L/min, $H_2$:0.14 L/min). The generated hydrogen gas was in an amount capable of operating a 10 W PEMFC. Since the formic acid is supplied and decomposed at a constant feed rate, the concentration of the formic acid in the reactor is maintained to be 10 wt % or below.

TEST EXAMPLE 1

Figure 3:
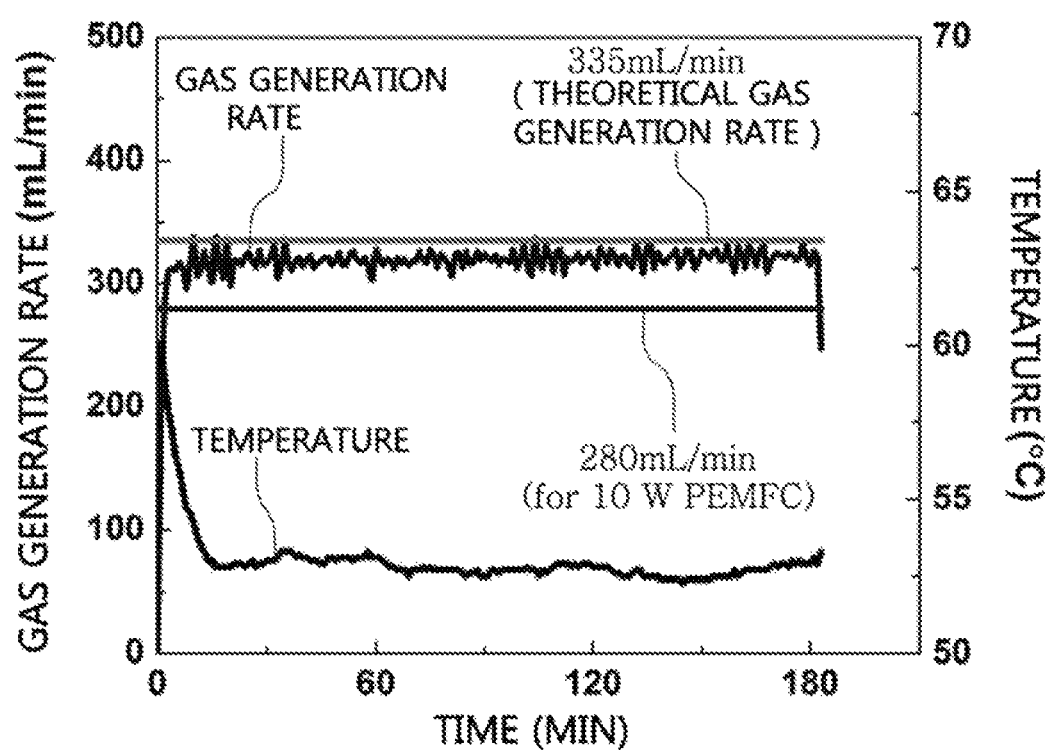
FIG. 3 is a graph showing a gas generation rate (hydrogen and carbon dioxide) and a reaction rate of the apparatus for generating hydrogen according to an embodiment of the present disclosure, based on time.

Decomposition characteristics of the formic acid were analyzed by measuring a hydrogen generation rate and a reaction rate based on time, during the hydrogen-generating reaction of Example 1. The analysis results are depicted in FIG. 3. As can be seen from FIG. 3, under the selected test conditions, hydrogen was stably generated, and 95.5% of formic acid was decomposed. In Example 1, 57 g of formic acid and 40 g of water were used, which gives the same effects as the case where an aqueous formic acid solution with a concentration of 58.8 wt % was used.

Figure 4:
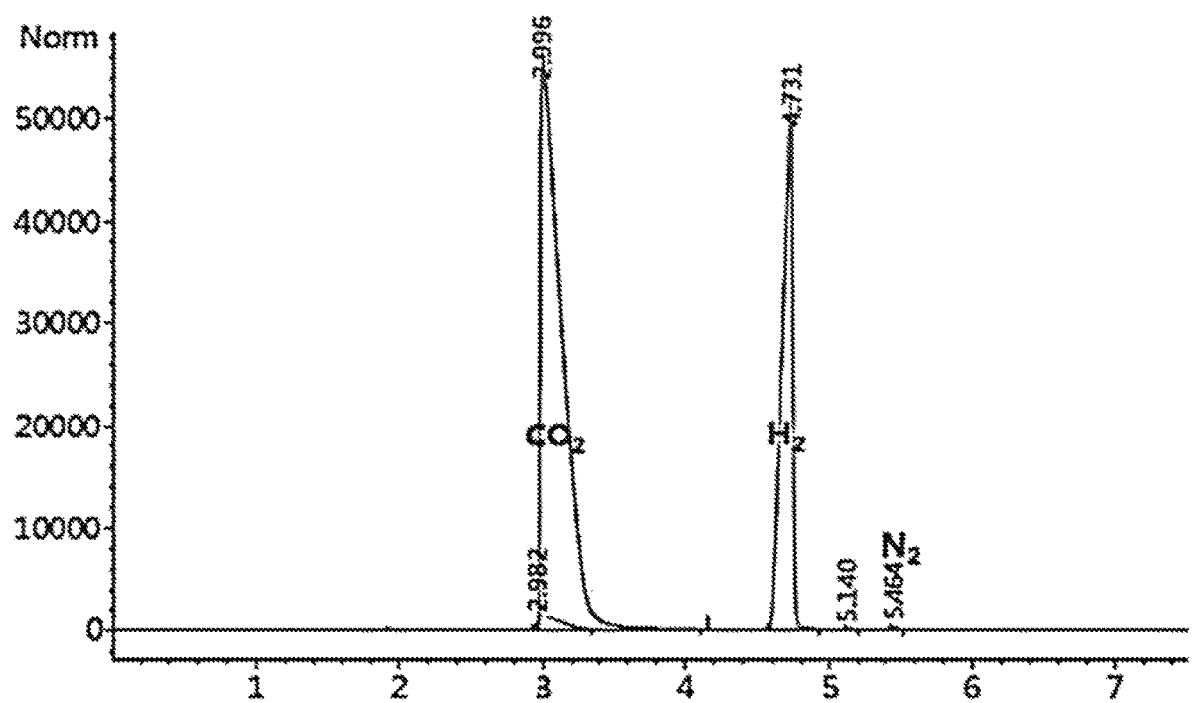
FIG. 4 is a graph showing analysis results of a generated gas of the apparatus for generating hydrogen according to an embodiment of the present disclosure.

The analysis results of the decomposed gas are depicted in FIG. 4. As shown in FIG. 4, $CO_2$ and $H_2$ ($N_2$ was detected due to a small amount of gas mixed thereto) were measured, and CO was not measured. Detection limit of GC for CO used in the analysis was 5 ppm or below. Since CO was not detected, it can be understood that hydrogen generated at the hydrogen generator may be directly supplied to the PEMFC without passing through any separate CO removing device.

In other words, by injecting a high-concentration formic acid into a reactor containing certain amounts of water and catalyst and then decomposing the formic acid, it was possible to enhance the energy density and the extent of a formic acid decomposition. Different from the existing technique where only 18% of formic acid is decomposed using about 45 wt % of formic acid solution, the apparatus for generating hydrogen according to the present disclosure decomposes 95.5% of formic acid by using 57 g of formic acid and 40 g of water (58 wt % of formic acid solution). Since the hydrogen generator of the present disclosure may ensure high energy density, this may be applied as a hydrogen source of a mobile fuel cell system.

The invention claimed is:

1. An apparatus for generating hydrogen by dehydrogenation of a formic acid, comprising:
    a reactor containing a heterogeneous catalyst, wherein the reactor has an opening within the reactor capable of feeding water to the reactor;
    a syringe pummp connected to the reactor configured to supply a formic acid into the reactor;
    a moisture remover connected to the reactor configured to remove moisture generated at the reactor; and
    a cold trap bath configured to condense the moisture removed by the moisture remover and supply the condensed moisture as in a form of water to the reactor,
    wherein the cold trap bath is connected to the reactor to supply the water to the reactor via the opening,
    wherein the heterogeneous catalyst comprises a metal heterogeneous catalyst and a catalyst support,
    wherein the metal heterogeneous catalyst is at least one selected from the group consisting of Pt, Rh, Ru, Au, Ag, Pd, Ni, Co, Cu, and Fe.

2. The apparatus for generating hydrogen according to claim 1,
    wherein the heterogeneous catalyst is a solid catalyst.

3. The apparatus for generating hydrogen according to claim 1,
    wherein the formic acid supplied to the reactor by the syringe pump is an aqueous formic acid solution with a concentration of 70 to 99.9 wt %.

4. The apparatus for generating hydrogen according to claim 1,
    wherein the syringe pump supplies the formic acid to the reactor at a feed rate of 0.1 mL to 2.2 L per minute.

5. The apparatus for generating hydrogen according to claim 1,
    wherein the water contained in the reactor and the formic acid supplied to the reactor by the syringe pump are mixed at the reactor to form an aqueous formic acid solution with a concentration of 20 to 90 wt %.

6. The apparatus for generating hydrogen according to claim 1,
    wherein the catalyst support is at least one selected from the group consisting of a metal foam, a carbon support, and a porous support.

7. The apparatus for generating hydrogen according to claim 6,
    wherein the carbon support is any one of any one of a carbon sheet, a carbon felt, a carbon black, and a carbon nanotube.

8. The apparatus for generating hydrogen according to claim 6,
    wherein the porous support is any one of Al2O3, ZrO2, TiO2, and CeO2.

9. The apparatus for generating hydrogen according to claim 1,
    wherein the metal heterogeneous catalyst is Pd/mesoporous g-C3N4 (Pd/mpg-C3N4).

10. A method for generating hydrogen by dehydrogenation of a formic acidly by utilizing the apparatus of claim 1, comprising,
  adding a formic acid to a mixture of water and a heterogeneous catalyst to perform a dehydrogenation reaction.

11. The method for generating hydrogen according to claim 10, further comprising:
  removing a moisture generated at the dehydrogenation reaction.

12. The method for generating hydrogen according to claim 11, further comprising:
  condensing the moisture removed in the moisture removing step and using the condensed moisture as water for the dehydrogenation reaction.

13. The method for generating hydrogen according to claim 10,
  wherein the formic acid is an aqueous formic acid solution with a concentration of 70 to 99.9 wt %.

14. The method for generating hydrogen according to claim 10,
  wherein the formic acid is added at a feed rate of 0.1 mL to 2.2 L per minute.

15. The method for generating hydrogen according to claim 10,
  wherein the water and the formic acid are mixed to form an aqueous formic acid solution with a concentration of 20 to 90 wt %.

* * * * *